United States Patent [19]
Bailey et al.

[11] Patent Number: 4,793,523
[45] Date of Patent: Dec. 27, 1988

[54] METERING MECHANISM

[75] Inventors: Alfred J. Bailey, Coventry; David E. Stone, Leicester, both of United Kingdom

[73] Assignee: Massey-Ferguson Services N.V., London, England

[21] Appl. No.: 878,873

[22] PCT Filed: Jul. 26, 1985

[86] PCT No.: PCT/GB85/00333
§ 371 Date: Apr. 21, 1986
§ 102(e) Date: Apr. 21, 1986

[87] PCT Pub. No.: WO86/01370
PCT Pub. Date: Mar. 13, 1986

[30] Foreign Application Priority Data
Aug. 22, 1984 [GB] United Kingdom ............... 8421338

[51] Int. Cl.⁴ ............................................ B65D 88/54
[52] U.S. Cl. ................................. 222/288; 222/299; 222/317; 222/329; 222/564
[58] Field of Search ............................... 222/298–300, 222/303, 305, 311, 312, 314, 317, 368, 414, 547, 564, 329, 288, 315, 476; 111/34, 35, 77

[56] References Cited
U.S. PATENT DOCUMENTS

| 253,926 | 2/1882 | King | 222/368 X |
| 288,471 | 11/1883 | Miller | 222/317 X |
| 500,323 | 6/1893 | Esler | 222/317 X |
| 1,178,571 | 4/1916 | Bozard | 222/300 X |
| 1,322,705 | 11/1919 | Locke | 222/312 X |
| 1,519,928 | 12/1924 | Priesnitz | 222/368 X |
| 3,118,575 | 1/1964 | McCauley | 222/564 X |
| 3,463,360 | 8/1969 | Dorfman | 222/288 X |
| 4,479,591 | 10/1984 | Burkhart et al. | 222/317 |
| 4,705,220 | 11/1987 | Gandrud et al. | 222/317 X |

FOREIGN PATENT DOCUMENTS
245912 4/1912 Fed. Rep. of Germany .
806511 12/1936 France ............................... 222/317

Primary Examiner—Michael S. Huppert
Assistant Examiner—Nils E. Pedersen

[57] ABSTRACT

A metering mechanism comprises a housing (7) with a material inlet (12) and a rotary metering member (27) that is rotatably mounted between side walls (8,9) of the housing with its periphery exposed to a chamber (48) within the housing so as to meter material from the chamber as it rotates, characterized in that a removable insert (74) is provided that is a close fit in said chamber and has a passage (75) through it that communicates at one end with said inlet (12) and at the other end with the periphery of the rotary metering member (27) so that the effective volume of said chamber (48) is reduced to the volume of said passage (75). Thus, if the metering mechanism incorporates the known shutter-type tramlining device in which a shutter (24) serves to close the inlet (12) to the housing, the quantity of speed retained in the chamber within the housing is reduced and therefore the length of a bout that will be sown after closing the shutter will be correspondingly reduced. The metering mechanism may also incorporate a tramlining device comprising an arcuate shutter member (84) that is mounted within the housing so as to be rotatable about the rotary metering member between the periphery of the rotary metering member and the insert, thereby to open or close said other end of the passage (75) under the control of an external control mechanism (87). The arcuate shutter member (84) is carried on one side of an annular support member (35) that is rotatably mounted on a side wall (8, 37) of the housing and receives the adjacent end of the rotary metering member (27) as a close rotary and axially slideable fit.

17 Claims, 10 Drawing Sheets

METERING MECHANISM

TECHNICAL FIELD

This invention relates to a metering mechanism suitable for use in metering material such as seed and fertilizer in an agricultural drill.

Agricultural drills are often provided with tramlining devices that are associated with preselected metering mechanisms so that the discharge of seed by these mechanisms can be stopped at will, thereby to leave unsown rows in selected bouts that form so-called tramlines in the ultimate crop for the wheels of tractors or other crop treatment vehicles. The tramlining devices commonly take the form of linearly slidable shutters interposed between the seed or fertilizer hopper and the inlet of the metering mechanism so as to close off the inlet when tramlining. An inherent feature of this construction is that the shutter cannot stop the discharge of seed that has already passed through the inlet into the metering mechanism so that even after the shutter has closed seed will continue to be discharged until the metering mechanism has emptied. In the case of fine seed, such as oil seed rape, the metering mechanism may contain enough seed to sow a large part of a bout and thus tramlines will not be effectively formed.

In order to overcome this problem, other tramlining devices have been proposed which employ clutches that can be operated to disconnect the drive to the metering mechanism so that no material is discharged. However, the clutches used have tended to be complicated and therefore costly and often unreliable in operation.

DISCLOSURE OF THE INVENTION

An object of the present invention is to provide a metering mechanism in which the problem of continued unwanted seed discharge is mitigated or overcome when used with a shutter type tramlining device.

A metering mechanism according to the invention comprises a housing with a material inlet and a rotary metering member that is rotatably mounted between side walls of the housing with its periphery exposed to a chamber within the housing so as to meter material from the chamber as it rotates, characterised in that a removeable insert is provided that is a close fit in said chamber and has a passage through it that communicates at on end with said inlet and at the other end with the periphery of the rotary metering member so that the effective volume of said chamber is reduced to the volume of said passage. Thus, if the metering mechanism incorporates the known shutter-type tramlining device in which a shutter serves to close the inlet to the housing, the quantity of seed retained in the chamber within the housing is reduced and therefore the length of a bout that will be sown after closing the shutter will be correspondingly reduced.

Additionally or alternatively, the metering mechanism according to the invention incorporates a tramlining device comprising an arcuate shutter member that is mounted within the housing so as to be rotatable about the rotary metering member between the periphery of the rotary metering member and the insert, thereby to open or close said other end of the passage under the control of an external control mechanism. Thus the shutter member serves to shut off the supply of material from the passage of the insert to the rotary metering member so that none of the material in said passage is discharged once the shutter member is closed.

Operation of the tramlining device is therefore immediately effective in stopping the discharge of material and causing tramlines to be produced even when sowing fine seed.

The arcuate shutter member may conveniently be carried on one side of an annular support member that is rotatably mounted in a circular aperture in a side wall of the housing and has a central aperture that receives the adjacent end of the rotary metering member as a close rotary and axially slidable fit. The external control mechanism may comprise an actuator, such as a hydraulic ram, and a connection between the actuator and an operating portion of the support member located externally of the housing. A tramlining device of this design is as simple as the known shutter-type of tramlining device and is therefore similarly inexpensive and reliable in operation.

DESCRIPTION OF THE DRAWINGS

The invention will now be described by way of example with reference to the accompanying drawings, in which.

BEST MODE OF CARRYING OUT THE INVENTION

Figure 1:
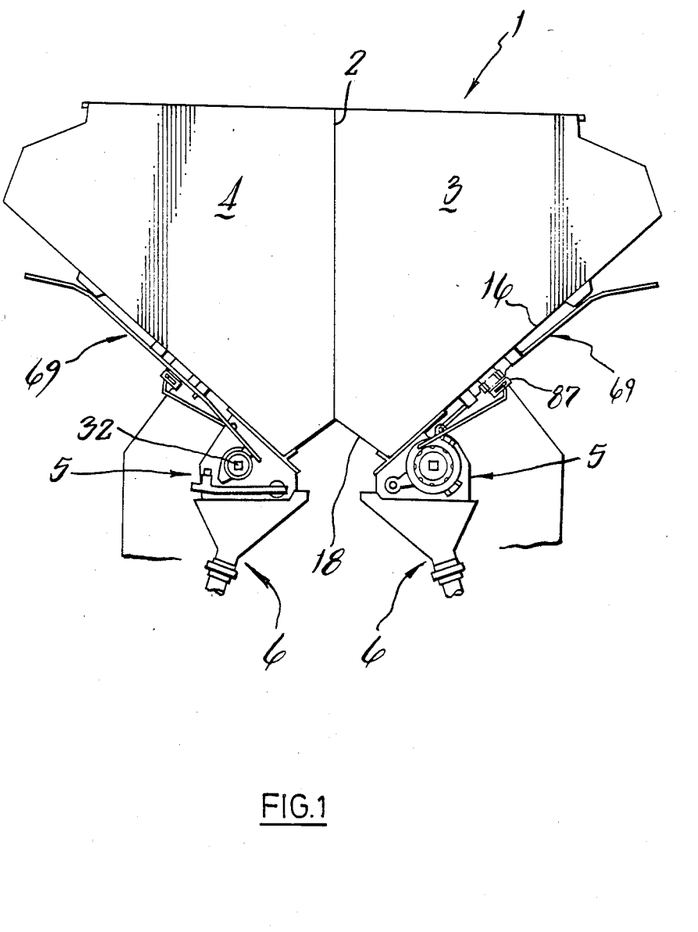
FIG. 1 is a diagrammatic end view of a combined seed and fertilizer drill including metering devices according to the present invention.

The combined seed and fertilizer drill shown in FIG. 1 comprises a hopper 1 having a vertical internal partition 2 dividing it into a seed and fertilizer compartment 3,4, respectively. The compartments 3,4 are similar and each has associated with it a plurality of metering devices 5 to meter seed or fertilizer from the hopper into respective delivery tubes 6 that are connected to coulters (not shown) at their lower ends, thereby to deliver seed and fertilizer to furrows opened by the coulters in the soil.

Each metering device 5 comprises a housing 7 having a pair of parallel upright side walls 8, 9 interconnected by walls 10, 11 front and rear, with the upper edges of all four walls defining a rectangular inlet opening 12 surrounded by an outwardly projecting fastening flange 13. Four tapped holes 14 in the flange 13 allow the housing to be secured by screws 15 to the bottom wall 16 of the hopper with the opening 12 communicating with an outlet 17 in the bottom wall 16 to receive seed or fertilizer. Outlet 17 is formed at the lower edge of wall 16 where the latter joins an oppositely inclined bottom wall 18, and a locating lug 19 formed by an upward extension of the wall 10 cooperates with the bottom wall 18 to locate the housing. Locating pegs 20 are also formed on the flange 13 each side of the opening 12 to engage corresponding holes 21 in the bottom wall 16 each side of the outlet 17.

A shallow recess is formed in the upper face of the flange 13 by rebates 22 along the side of each opening parallel to the side walls 8, 9, and by a channel 23 across the rear of the flange. This recess is adapted to receive a shutter 24, if needed for tramlining, the shutter being linearly slidable in the recess and being operated by an external control mechanism (described hereinafter) so that it closes opening 12 to stop the transfer of seed from the hopper into the metering device. Thus, the corresponding furrows remain unsown and form tramlines in the growing crop for the tractor or implement wheels in subsequent crop treatment operations.

A pair of rearwardly opening slots 25, 26 are formed in the side walls 8, 9 of the housing 7 and support a rotary metering member 27 with its axis of rotation extending transversely of the side walls 8, 9. The rotary metering member 27 comprises a groove feed roll 29 having a tubular coaxial extension 30 on which is rotatably mounted a cut-off member 31. A square section drive shaft 32 extends through the feed roll 29 and engages a corresponding section in the tubular extension 30 so that the shaft serves to rotate the metering roll. A collar 33 is mounted on the free end of the tubular extension 30 and serves to retain the cut-off member axially thereon against the metering roll. A radial grub screw 34 secures the collar to the tubular extension 30 and also engages the driveshaft 32 to key the whole rotary membering member 27 axially in position on the drive shaft 32.

Figure 3:
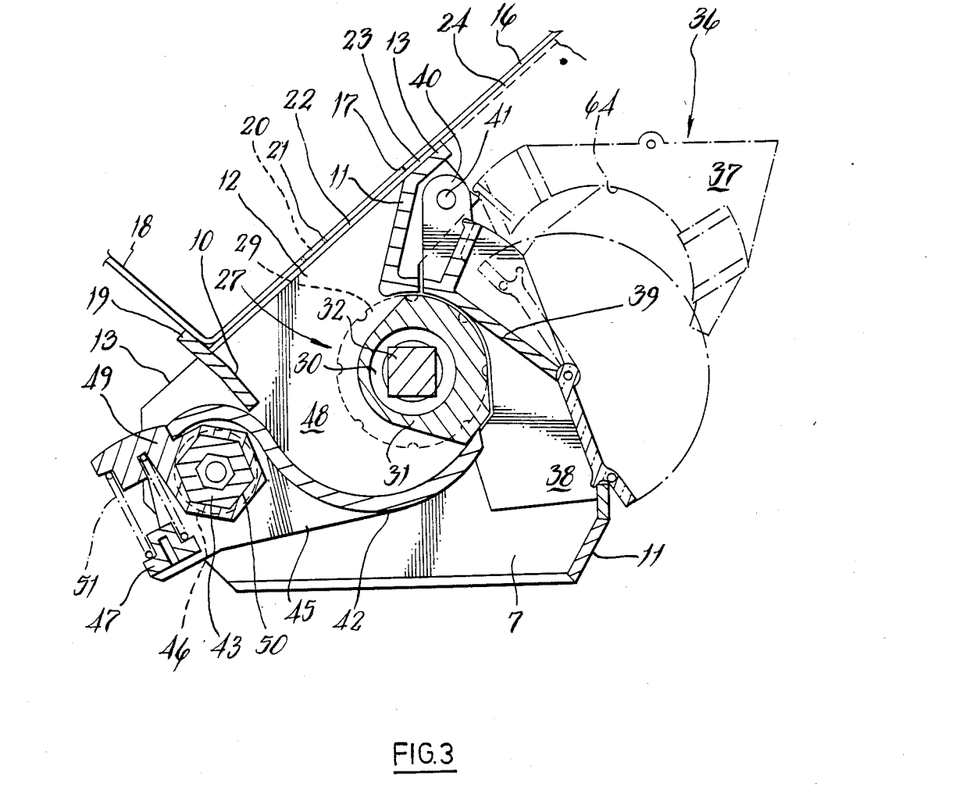
FIG. 3 is a transverse cross-sectional view of the metering device of FIG. 2.

The cut-off member 31 is non-circular in cross-section, and the slot 26 in the adjacent side walls 9 of the housing 7 is correspondingly shaped to receive the cut-off member as a close non-rotatable fit. The slot 25 in the opposite side wall 8 is U-shaped and supports annular sealing means 35 through which the feed roll 29 projects. The cut-off member 31 and the sealing means 35 are retained in their respective slots 26, 25 by a closure member 36 in the form of a pivoted flap having side wall portions 37, 38 coplanar with the side walls 8, 9, respectively, and which are shaped to cooperate with the slots 25, 26 and closely surround the whole periphery of the sealing means 35 and cut-off member 31, respectively. The closure flap has a rear wall 39 interconnecting the side wall portions 37, 38 and a pair of lugs 40 project from the upper end of the rear wall 39 below the rear of flange 13 and are connected between the side walls 8, 9 by a pivot pin 41 so that the flap swings downwards into engagement across the rear of the housing 7. In this position, the rear wall 39 forms a continuation of the wall 11 of the housing and passes closely over the top of the rotary metering member 27 (See FIG. 3).

Figure 4:
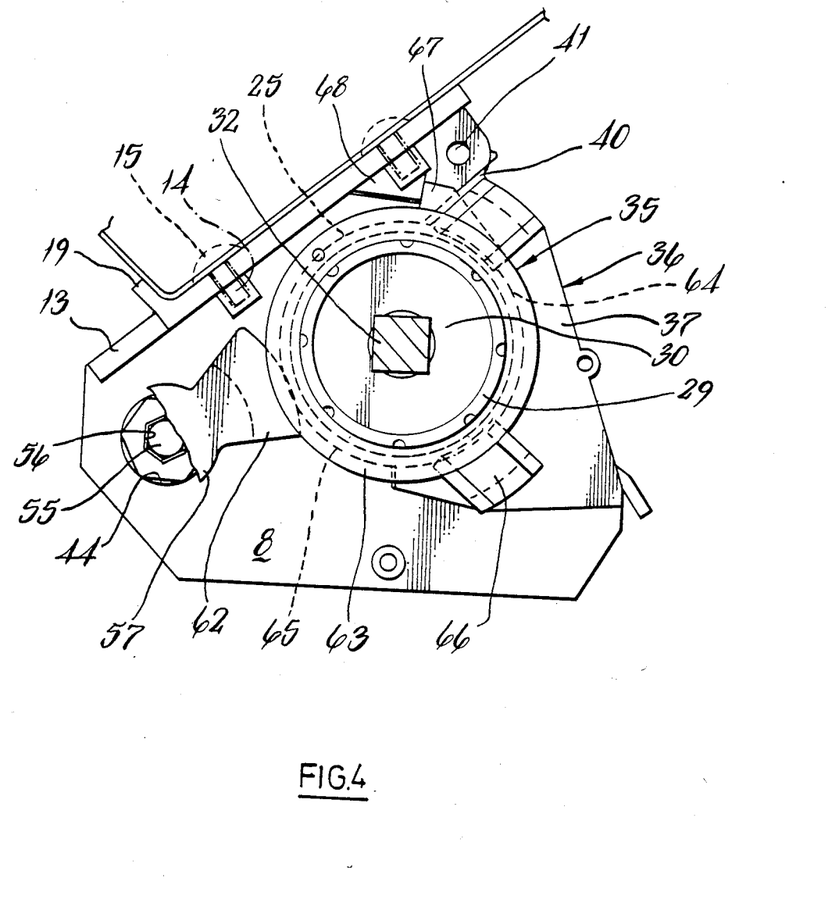
FIG. 4 is a side view of the metering device of FIG. 2 as seen from the left-hand side.

A cut-off flap 42 is pivotally mounted within the housing on a transverse shaft 43 that is rotatably supported in circular apertures 44 in the side walls 8, 9 below the front of flange 13. The flap 42 has side walls 45 formed with circular apertures 46 for the shaft 43 and connected by a cross member 47. The flap 42 extends rearwards from the shaft 43 below the wall 10 and in an arc below the metering member 27, and the rear end of the flap is spring-loaded against the underside of the cut-off member 31. The cut-off flap 42 therefore forms the lower wall of a seed chamber 48 within the housing from which seed is metered over the rear edge of the cut-off flap by rotation of the feed roll 29 in the anticlockwise sense, as seen in FIG. 4.

The mechanism that spring loads the cut-off flap 42 comprises a spring arm 49 that is non-rotatably mounted on the shaft 43 between the side walls 45 of the cut-off flap, the shaft 43 being of hexagonal cross-section and being received in a corresponding hexagonal section aperture 50 in the arm 49. A compression spring 51 acts between the arm 49 and the cross member 47 to urge the two apart. The angular position of the arm 49 is controlled by an external control lever 52 that is connected to one end of the shaft 43 alongside the side wall 9 of the housing. The lever 52 engages a recess 53 in the end of the shaft and is held therein by a nut and bolt 54, 55.

Figure 5:
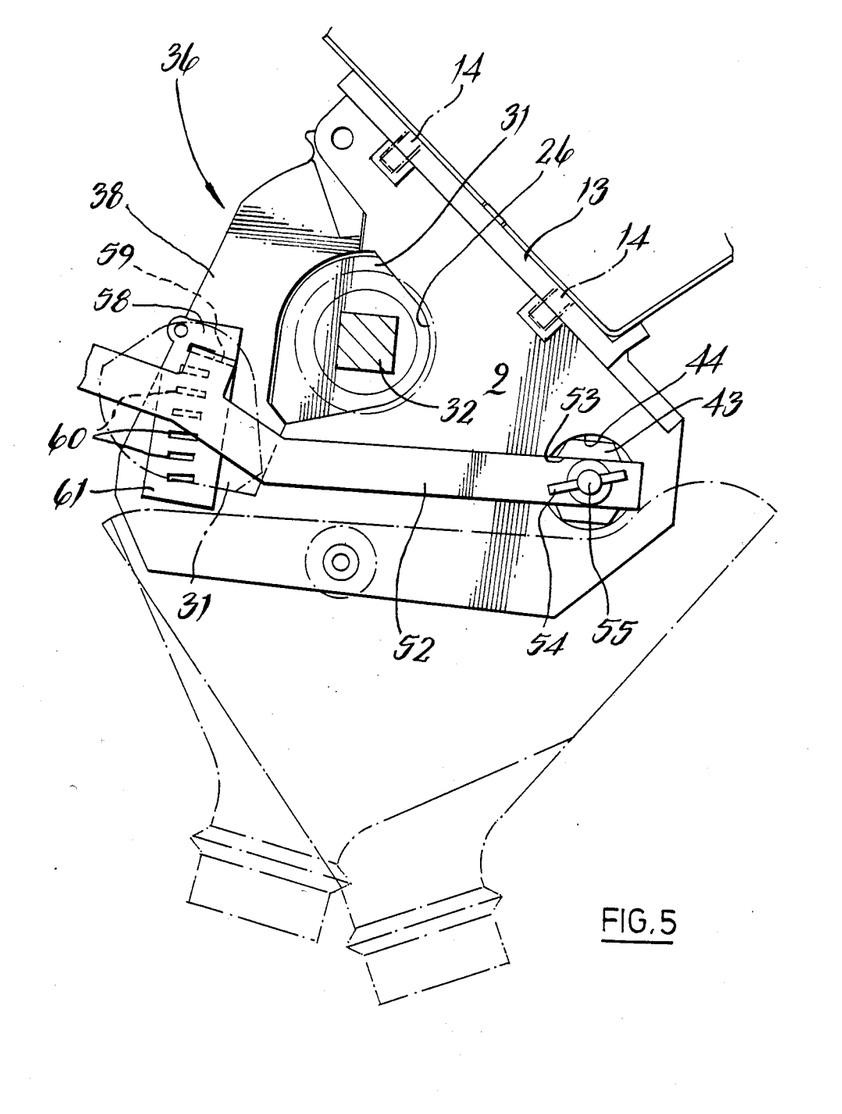
FIG. 5 is a side view of the metering device of FIG. 2, as seen from the right-hand side.

The bolt 55 is inserted through a hexagonal blind bore 56 from the other end of the shaft 43, (FIG. 4) and the wing nut 54 is threaded onto the end of the bolt that projects from the shaft through the end of the control lever 52 (FIG. 5). The bolt 55 is held against rotation by engagement of the hexagonal head of the bolt in the hexagonal blind bore 56. A collar 57 formed on the opposite end of the shaft 43 abuts the adjacent side wall 8 of the housing once inserted through the apertures 44, and is retained in place by the control lever 52 once the latter is connected.

The angular position of the control lever 52 is determined by engagement with stop means 58 on the side wall portion 38 of the closure flag 36 (FIG. 5). A lug 59 on the lever 52 is selectively engageable with any one of a series of slots 60 formed in the stop means 58, the lever being resilient enough to allow the lug 59 to be moved side-ways to disengage the stop means 58, when required. Thus the angular setting of the control lever 52 controls the angular setting of the spring arm 49, which in turn determines the spring loading of the cut-off flap 42 against the cut-off member 31.

As well as controlling the spring-loading of the cut-off flap 42, it will be appreciated that engagement of the lug 59 with the stop means 58 serves to latch the closure flap 36 closed, thereby avoiding the need for any separate latch mechanism. Also, the lower end of the stop means 58 is formed as a lug 61 to overlap the outer face of the side wall 9 and thereby help support the closure flap laterally.

The control lever 52 also controls an abutment lug 62, that is formed as a radial extension of the collar 57 and cooperates with the sealing means 35 to retain the latter axially in place in the slot 25 in the side wall 8. As shown in FIG. 4, the abutment lug 62 is spaced away from the adjacent side wall 8 and moves in an arc with the control lever so as to overlap a peripheral flange 63 of the sealing means 35.

As shown in FIG. 4, the annular sealing means 35 comprises a ring that receives the feed roll 29 as a rotary and axially sliding fit and which is formed with said peripheral flange 63 that abuts the outer surface of the side wall 8. When the closure flap 36 is closed, the flange 63 also abuts the side wall portion 37 of the flap, and the slot 25 and a notch 64 in the wall portion 37 together completely encircle and engage an annular shoulder 65 formed on the rear of the flange 63. Also, a pair of abutment lugs 66 are provided on the side wall portion 37, top and bottom, with their free ends spaced away from the side wall portion 37 so as to overlap the flange 63. Thus the two abutment lugs 66 on the flap 35 and the abutment lug 62 controlled by the control lever 52, serve to retain the sealing means 35 axially in place against the side wall 8 of the housing, the abutment lugs 66 engaging automatically when the closure flap 36 is closed, and the abutment lug 62 engaging automatically when the control lever 52 is operated to latch the flap closed.

Once fitted in place, rotation of the sealing means 35 is prevented by a radially projecting lug 67 at the periphery of the ring that cooperates with a stop 68 formed in the housing side wall 8 below the fastening flange 13.

Figure 2:
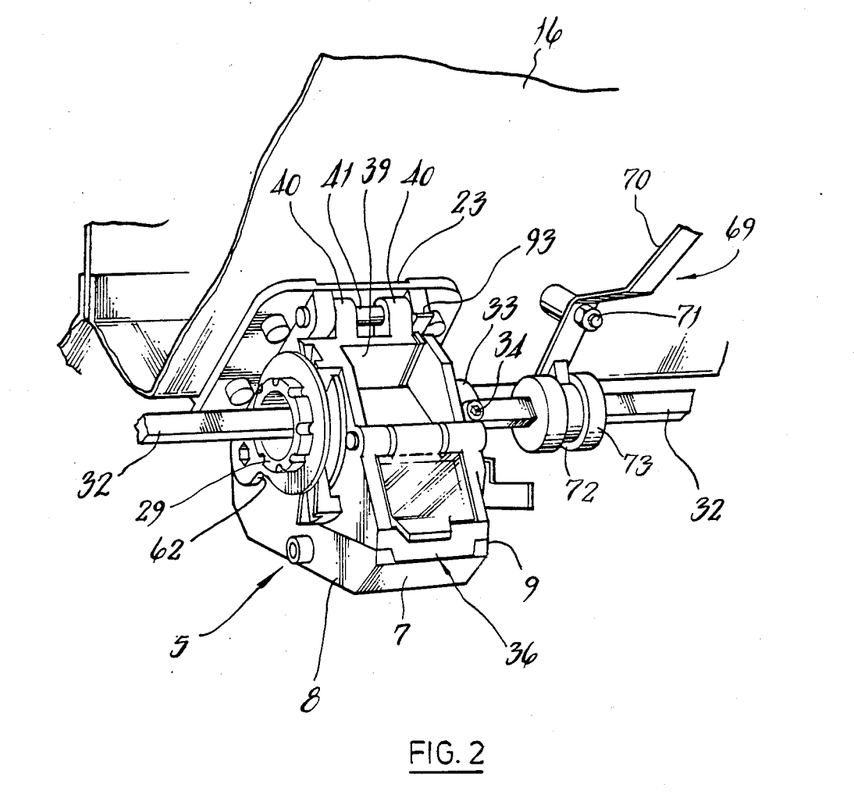
FIG. 2 is a perspective view of a metering device with the rear closure flap closed.

It will be appreciated from FIGS. 1 and 2 that a plurality of metering devices are driven by the one coaxial drive shaft 32 that passes through a rotary metering member 27 in each. The metering rate of these devices is adjusted simultaneously by moving the shaft 32 axially under the control of a lever adjust mechanism 69 that is mounted on the bottom wall 16 of the hopper. This mechanism comprises a lever 70 connected to pivot about a pivot pin 71 and engaging a recess 72 in a cylindrical guide 73 on the shaft 32.

Removal of the rotary metering members 27 on the common shaft 32 can be achieved readily by opening all the closure flaps 36 and pulling the shaft 32 rearwards. The metering devices can then be cleaned or the rotary metering members 27 replaced, the sealing means 35 located in the slot 25 of each unit, and the closure flap 36 of each housing then closed and latched closed by the control lever 52.

The rotary metering members 27 illustrated are all fitted with feed rolls 29 that are suitable for metering fine seed such as rape. The seed chamber 48 within the housing 7 is capable of containing enough fine seed to sow a long length of furrow down a bout so that even if a linearly slidable shutter 24 is provided to close the inlet opening 12 for tramlining, tramlines are not formed immmediately the shutter is closed, and may not be formed at all on a short bout. In order to counter this problem, a moulded plastics insert 74 is provided (see FIGS. 6 to 8) that fits into the seed chamber 48 of each seed metering device adapted for tramlining, thereby to reduce the effective volume of the seed chamber to a passage 75 through the insert between the inlet opening 12 and the periphery of the feed roll 29.

Figure 8:
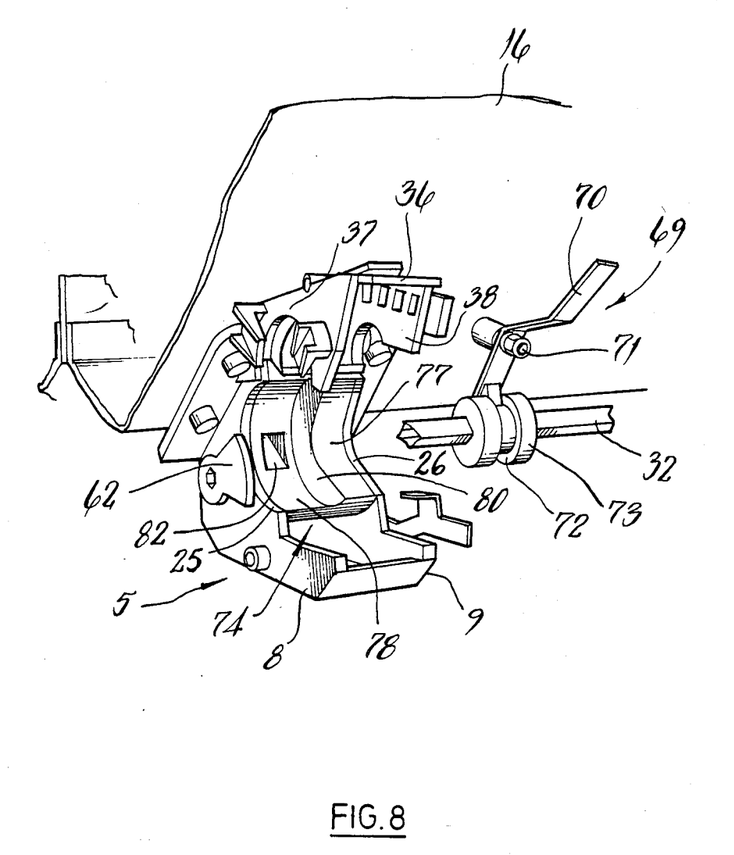
FIG. 8 is a perspective view of the rear of the metering device of FIG. 6 with the closure flap open and the rotary metering member removed.

The exterior of the insert 74 conforms closely to the shape of the seed chamber 48 within housing 7 and can be removeably fitted therein by insertion from within the hopper 3 through the outlet 17 and communicating inlet opening 12 of the housing. This is done when the rotary metering member 27 is removed, as shown in FIG. 8. The insert closely engages the front and rear walls 10,11 and the cut-off flap 42 over the full width of the housing, and closely engages both side walls 8,9 of the housing. The upper face 76 of the insert adjacent the inlet opening 12 is flush with the rebates 22 either side of the opening. Also, a first vertical section 77 of the insert adjacent the side wall 9 is shaped to closely engage the cut-off member 31 while a second vertical section 78 of the insert adjacent the side wall 8 is shaped to be spaced evenly away from the outer cylindrical profile of the feed roll 29, thereby to create an arcuate gap 79 therebetween. A shoulder 80 is formed in the intermediate vertical plane between these two sections 77,78 corresponding to the different radial dimensions of the cut-off member 31 and feed roll 29 within the chamber 48. Axial adjustment of the rotary metering member 27 to vary the metering rate is therefore limited by abutment of the inner end of the feed roll 29 with the vertical shoulder 80, but this corresponds to the highest rate that is needed with fine seeds.

The passage 75 through the insert is formed in the vertical section 78 and has an upper opening 81 in the upper face 76 of the insert and a lower opening 82 that opens into the arcuate gap 79 at a height substantially centered on the axis of rotation of the feed roll 29. The upper portion of the passage 75 has a tapering shape to funnel seed into the passage from the inlet opening 12, and the floor 83 of the passage is inclined downwards and rearwards between the upper and lower openings 81,82 to assist the feed of seed. Seed entering the gap 79 from the opening 82 is feed downwards through this gap and over the rear edge of the cut-off flap 42 by the rotary action of the grooved feed roll 29. It will be appreciated that if the linearly slidable shutter 24 is closed for tramlining, the upper opening 81 of passage 75 is closed and only the limited quantity of seed contained in the passage and gap 79 will be discharged before a tramline is formed.

Figure 6:
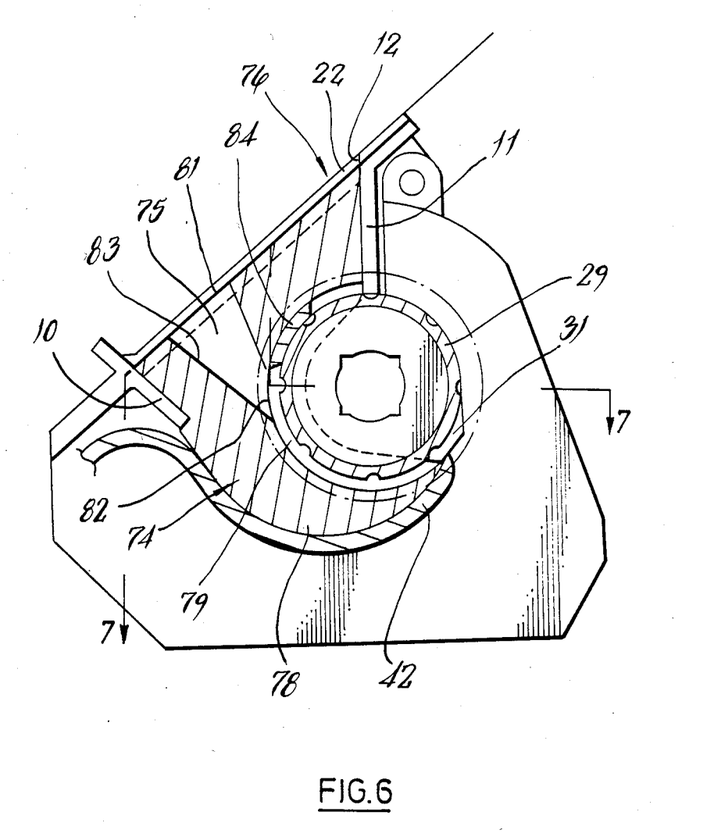
FIG. 6 is a vertical section through a metering device adapted for tramlining by the provision of an insert.
Figure 7:
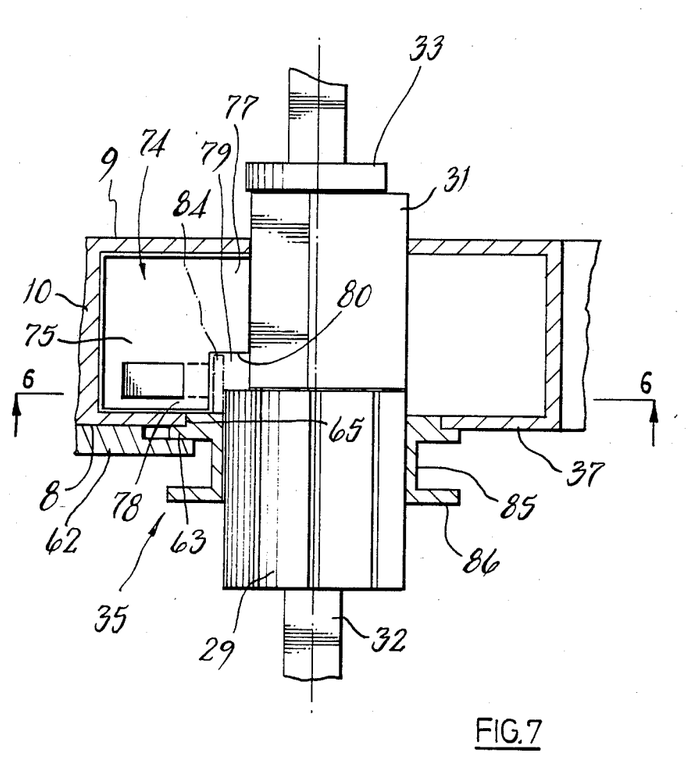
FIG. 7 is a horizontal section on the line 7—7 in FIG. 6 through the axis of the rotary metering member.

In order to prevent even the limited amount of seed in passage 75 from being discharged during a tramlining bout, an arcuate shutter member 84 is mounted within the gap 79 and is rotatable about the rotary metering member 27 between an open position above and clear of the opening 82 (as shown in full outline in FIG. 6) and a closed position extending fully across the opening 82 (as shown in broken outline in FIGS. 6 and 7).

The rotatable arcuate shutter member 84 is carried on a modified annular sealing means 35, which like that shown in FIG. 4 comprises a ring with a flange 63 and a shoulder 65 on the rear which is encircled by the side walls 8 and 37. The shutter member 84 is formed as a projection on the rear of the ring 35 which extends into the gap 79 across substantially its full width (FIG. 7) and is a close rotary sliding fit with the adjacent curved surface of the insert. A sleeve 85 forms a coaxial extension of the sealing means that receives the feed roll and carries an operating flange 86 at its outermost end for connection of an external control mechanism.

Figure 9:
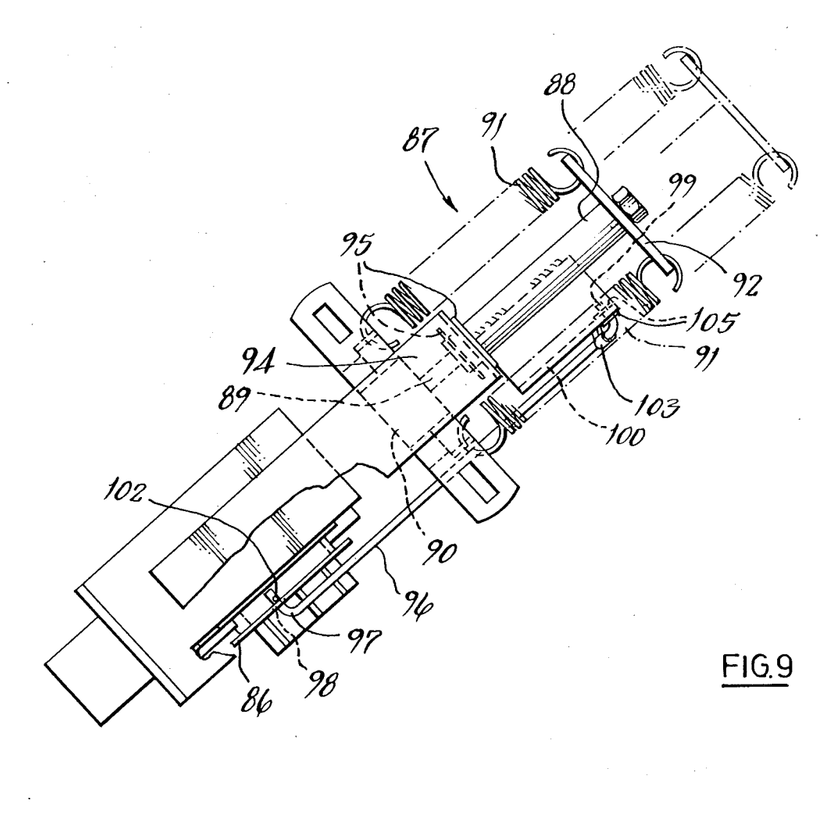
FIG. 9 is a plan view showing the external control mechanism of the tramlining shutters.
Figure 10:
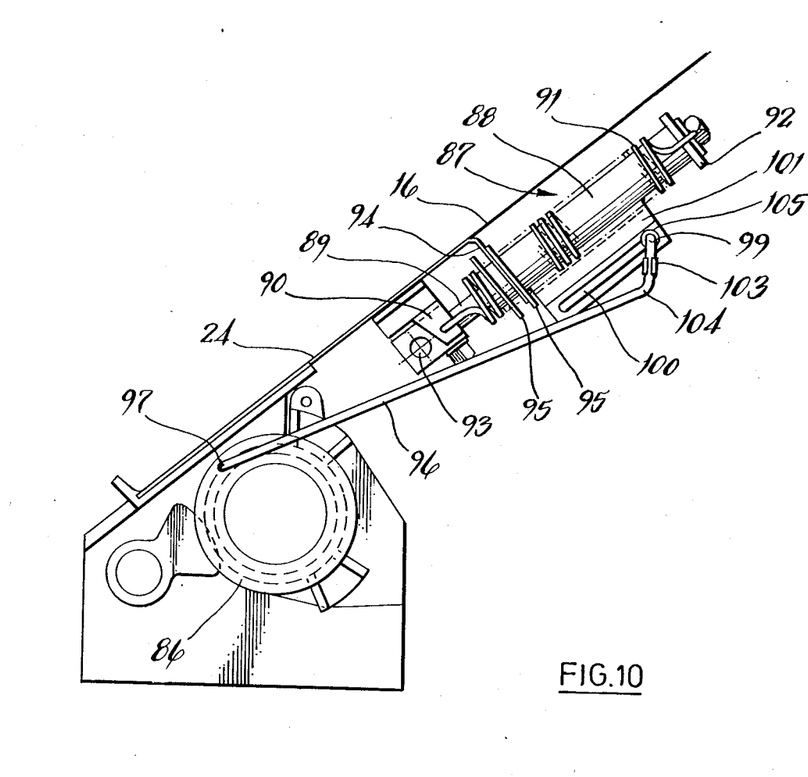
FIG. 10 is a side view of the external control mechanism of FIG. 9.

The control mechanism shown in FIGS. 9 and 10 is similar to that disclosed in British Pat. No. 2034562 and comprises a single-acting hydraulic actuator 87 that acts against a spring-return action to open the tramline shutter. The actuator comprises a ram having a cylinder 88 that is moveable on a piston rod 89 carried on a mounting block 90 secured to the bottom wall 16 of the hopper. Return springs 91 connected between the mounting block 90 and a cross-piece 92 on the cylinder produce the spring-return action. The hydraulic connection 93 to the ram is conveniently made via the mounting block 90 and an internal passage in the piston rod 89.

As shown in FIGS. 9 and 10, the actuator 87 is adapted to operate both the linearly slidable shutter 24 and the rotatable arcuate shutter member 84 simultaneously. The shutter 24 extends rearwards beneath the mounting block 90 and is formed with a right-angled end 94 with an aperture through which the cylinder 88 extends. A pair of spaced apart abutment members 95 on the cylinder either side of the end 94 serve to connect the shutter to the cylinder and allow a limited amount of lost motion. The arcuate shutter member 84 carried on the sealing means 35 is connected to the actuator 87 via a push-pull member 96 in the form of a rod having one end 97 bent through a right-angle and engaging a hole 98 in the operating flange 86 of the sealing means 35, and having the other end 99 bent through a right-angle and engaging an elongate slot 100 in a bracket 101 connected to the actuator cylinder 88. A split pin 102 retains the one end 97 in the hole 98, and a U-shaped clip 103 retains the other end 99 in the slot 100. A cranked portion 104 of the rod adjacent the end 99 accommodates connection of the clip to the rod with its to arms 105 straddling the bracket 101 and each engaging a portion of the rod either side of the bracket. The slot 100 in the bracket 101 extends in the direction of movement of the cylinder 88 so as to provide sufficient lost motion for the arcuate shutter member 84 to be operated only at the ends of the working stroke of the actuator 87.

The hydraulic actuator 87 is connected in a hydraulic control circuit and may be operated at will or automatically in response to a bout counting system as described in the aforesaid British Pat. No. 2034562.

It will be appreciated that the linearly slidable shutter 24 could be dispensed with in the embodiment of FIGS. 6 to 9 so that tramlining is controlled exclusively by the rotatable arcuate shutter 84. Thus, either shutter 24 or 84 can be used independently to control tramlining, although shutter 84 is generally to be preferred because it is more immediately effective in stopping the discharge of seed. The advantage of providing both shutters as illustrated in FIGS. 6 to 10, is that the metering mechanism can then be readily converted to the known type with a shutter tramlining device by uncoupling the push-pull rod 96, removing the insert 74, and replacing the sealing means 35 with sealing means without the arcuate shutter 84. Such a mechanism with a suitable feed roll and sealing means 35 can be perfectly adequate when used with larger seed because the amount of seed retained in the seed chamber 48 is discharged rapidly once the shutter 24 is closed.

We claim:

1. A metering mechanism suitable for use in metering material such as seed and fertilizer in an agricultural drill comprising a housing with side walls defining a chamber and a material inlet, a feed roll and a cut-off member mounted on a rotary drive shaft between side walls of the housing with the periphery of the feed roll exposed to said chamber within the housing so as to meter material from the chamber as it rotates, a shutter member adapted to shut off the supply of material to the feed roll, and a removable insert that is a close fit in said chamber and has a passage through it that communicates at one end with said inlet and at the other end with the periphery of the feed roll, the insert having a first portion that is a close fit with the periphery of the cut-off member and a second portion that is spaced away from the periphery of the feed roll and is formed with an opening from said other end of the passage.

2. A metering mechanism as claimed in claim 1 in which the passage has an opening at said other end thereof which is substantially aligned horizontally with the axis of rotation of the rotary drive shaft.

3. A metering mechanism is claimed in claim 1 in which the cut-off member has a sector exposed to the chamber which is of smaller diameter than the feed roll, and the insert is formed with a shoulder between said first and second portions to accommodate these different diameters.

4. A metering mechanism as claimed in claim 3 in which the feed roll and cut-off member are axially adjustable within a range defined at one limit by engagement of the inner end of the feed roll with said shoulder.

5. A metering mechanism as claimed in claim 1 in which the shutter member is adapted to shut off the inlet to said chamber.

6. A metering mechanism as claimed in claim 5 in which a second shutter member is provided in the form of an arcuate shutter member that is mounted within the housing so as to be rotatable about the feed roll and within the second portion of the insert, thereby to open or close said opening.

7. A metering mechanism as claimed in claim 6 in which the arcuate shutter member moves downwards from the open to the closed position.

8. A metering mechanism as claimed in claim 6 in which the arcuate shutter member is carried on annular sealing means that is in rotary engagement with the feed roll.

9. A metering mechanism as claimed in claim 8 in which the annular sealing means is mounted on a side wall of the housing and carries the arcuate shutter member on one side thereof so as to project into the housing, the adjacent end of the feed roll being rotatably supported in the annular sealing means.

10. A metering mechanism as claimed in claim 9 in which the annular sealing means is rotatably received in a circular aperture in said side wall and has a central aperture that receives said adjacent end of the feed roll as a close rotary and axially slideable fit.

11. A metering mechanism as claimed in claim 10 in which the annular sealing means comprises a sleeve to receive the feed roll and which extends externally of the housing and is formed witn an annular flange to abut the outer surface of the said side wall.

12. A metering mechanism as claimed in claim 11 in which an operating flange is formed on said external sleeve for connection of an external control mechanism.

13. A metering mechanism as claimed in claim 6 which includes an external control mechanism to operate arcuate the shutter member comprising an actuator and a connection between the actuator and an operating portion of the arcuate shutter member that is located externally of the housing.

14. A metering mechanism as claimed in claim 13 in which the external control mechanism operates both said shutter member and said second arcuate shutter member.

15. A metering mechanism as claimed in claim 13 in which said connection comprises a push-pull member that is connected at one end to the operating portion of the arcuate shutter member and is connected at the other end to the actuator through a lost motion connection so that the shutter member is operated only over the final portion of the working stroke of the actuator.

16. A metering mechanism as claimed in claim 15 in which the lost motion connection comprises a pin-and-slot connection.

17. A metering mechanism as claimed in claim 13 in which the actuator comprises a hydraulic actuator.

* * * * *